United States Patent [19]

Rosen

[11] 3,928,597

[45] Dec. 23, 1975

[54] HYPERGLYCEMIA THERAPY

[75] Inventor: Harry Rosen, Drexel Hill, Pa.

[73] Assignee: American Home Products Corporation, New York, N.Y.

[22] Filed: Aug. 15, 1974

[21] Appl. No.: 497,806

[52] U.S. Cl. ............................................... 424/273
[51] Int. Cl.² .................................... A61K 31/415
[58] Field of Search .................................. 424/273

[56] References Cited
UNITED STATES PATENTS
3,803,155   4/1974   Solkowski et al. ................... 424/273

Primary Examiner—Jerome D. Goldberg
Attorney, Agent, or Firm—Stephen Venetianer

[57] ABSTRACT

The invention relates to a method of treating hyperglycemia in warm-blooded animals which utilizes administration to warm-blooded animals of a compound selected from the group of compounds defined below.

1 Claim, No Drawings

HYPERGLYCEMIA THERAPY

DESCRIPTION OF THE INVENTION

It has been discovered that a particular group of compounds previously known to be useful primarily as psychostimulants, anti-inflammatories and anti-pyretics, surprisingly are highly effective in relieving hyperglycemia in warm-blooded animals. The invention resides in the method of treating hyperglycemia in a warm-blooded animal by administering to the animal a therapeutically active amount of a compound selected from the group consisting of those having the following general fomulae:

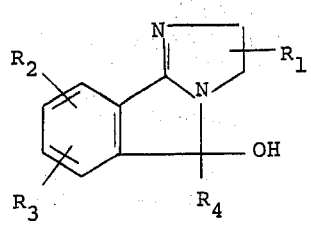

(I)

and

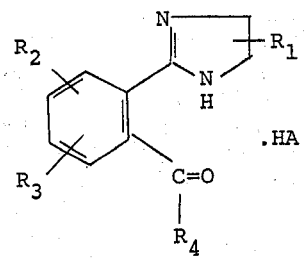

(II)

wherein $R_1$ is lower alkyl; $R_2$ is selected from the group consisting of hydrogen, halogen, amino, lower alkylamino, lower alkyl, and lower alkoxy; $R_3$ is hydrogen when $R_2$ and $R_3$ are dissimilar and when $R_2$ and $R_3$ are the same they are both selected from the group consisting of hydrogen, halogen, lower alkyl, and lower alkoxy; $R_4$ is selected from the group consisting of phenyl, monohalophenyl, dihalophenyl, trifluoro-methylphenyl, mono(lower)alkoxyphenyl, and di(lower)alkoxyphenyl; and HA is a pharmaceutically acceptable acid. Such compounds are disclosed in Belgian Patent No. 712,958, published September 10, 1968, incorporated herein by reference.

The compounds of formulae (I) and (II) are prepared by reacting a substituted phthalimidine according to the following procedure:

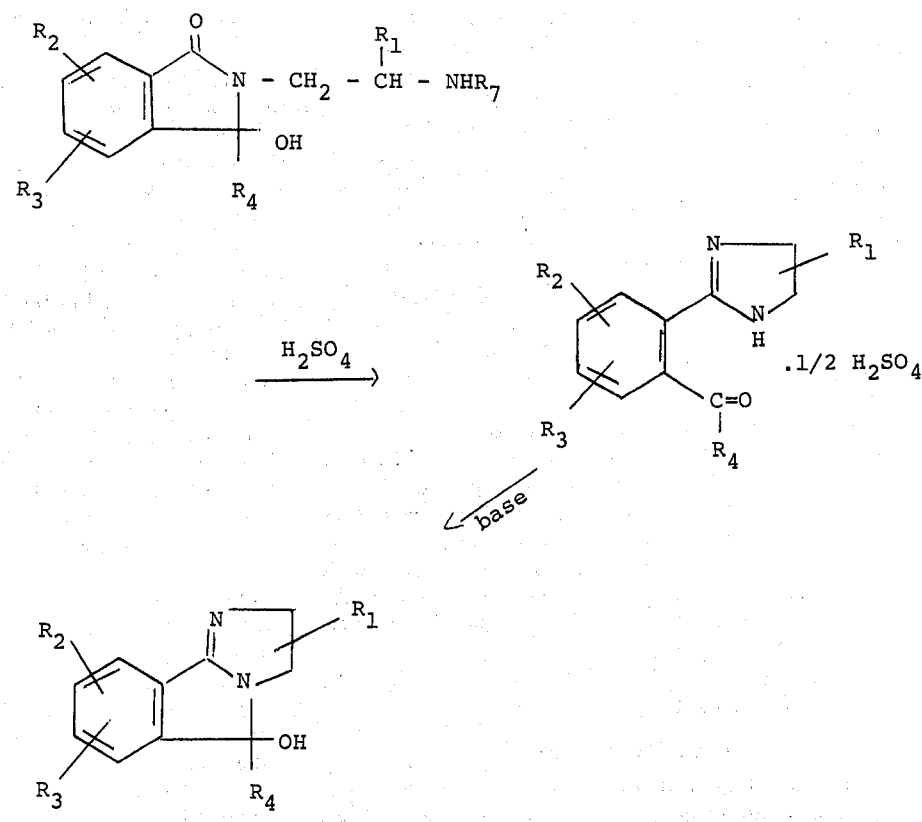

In the above reaction sequence, $R_1$, $R_2$, $R_3$ and $R_4$ are defined as above and $R_7$ is lower alkylsulfonyl, phenylsulfonyl, monohalophenylsulfonyl, dihalophenylsulfonyl, mono(lower)alkylphenylsulfonyl, di(lower)alkoxyphenylsulfonyl.

As employed herein the term (lower)alkyl includes straight and branched chain hydrocarbon moieties of from 1 to about 4 carbon atoms such as methyl, ethyl, propyl, i-propyl and butyl. The term (lower)alkoxy includes hydrocarbonoxy groups which contain from 1 to about 6 carbon atoms such as methoxy ethoxy, propoxy, butoxy and hexoxy. The term "halogen" and "halo" as used herein include bromine, fluorine, chlorine and iodine.

The substituted phthalimidines can be prepared by the sulfonylation of the intermediate phthalimidine compound. The intermediate phthalimidines are readily prepared by reacting a $\psi$ acid chloride of an o-aroyl benzoic acid with the appropriate substituted ethylene diamine compound. These type compounds are described in the literature (Sulkowski et al *J. Org. Chem.* 32, 2180).

They are cyclized to a 2-(2-imidazolin-2-yl)benzophenone by treatment with sulfur acid according to the procedure outlined above and treatment with a base affords the corresponding dihydroimidazoisoindolols.

For example, the compound referred to hereinafter as Compound 2 is prepared as follows:

A solution of 25 g of o-(p-fluorobenzoyl)benzoic acid, 75 ml of toluene, and 40 ml of 1,2-diaminopropane is refluxed in a flask equipped with a water separator. After refluxing 19 hours, the solution is extracted with water and then evaporated to dryness. The residue solidifies on standing, mp. 115°–120°C. The residue consists of 9b-(p-fluorophenyl)-2-methyl-1,2,3,9b-tetrahydro-5H[2,1-a]isoindol-5-one as the major product together with some 3-methyl isomer.

A solution of 38 g of the mixture from above, 32 g of p-toluenesulfonyl chloride and 125 ml of pyridine is refluxed for 19 hours. The mixture is evaporated to dryness and the residue is dissolved in 100 ml of ethanol. After standing 18 hours, the precipitated solid is separated and recrystallized twice from ethanol to obtain 9b-(p-fluorophenyl)-2-methyl-1,2,3,9b-tetrahydro-1-(p-tolylsulfonyl)-5H-imidazo[2,1-a]isoindol-5-one, mp. 215°–7°C.

Anal. Calcd for $C_{24}H_{21}N_2FSO_3$: C, 66.04; H, 4.85; N, 6.42. Found: C, 66.17, H, 4.79; N, 6.17.

A solution of 25 g of 9b-(p-fluorophenyl)-2-methyl-1,2,3,9b-tetrahydro-1-(p-tolylsulfonyl)-5H-imidazo[2,1-a]isoindol-5-one and 100 ml of 90% sulfuric acid is allowed to stand at room temperature for 45 minutes. The mixture is quenched with several volumes of ice water and neutralized with con. sodium hydroxide solution. The solid is separated and washed with water. On recrystallization from ethanol there is obtained 5-(p-fluorophenyl)-2,3-dihydro-2(3)methyl-5H-imidazo[2,1-a]isoindol-5-ol, mp. 168°–170°C.

Anal. Calcd. for $C_{17}H_{15}FN_2O$: C, 72.32; H, 5.35; N, 9.92. Found: C, 72.25; H, 5.36; N, 9.66.

TEST METHOD

Male rats weighing 170–200 grams are fasted overnight, a control blood sample is taken from the tail and a test dose of 60 mg/kg is administered by stomach tube. Subsequent blood samples are taken at hourly intervals for five hours. Four rats were used in each of the following tests.

In general, a compound is considered active if a depression in blood sugar approximating 20% is observed for at least three of the five hour test period.

COMPOUNDS TESTED 1. 2,3-dihydro-2(or 3)-methyl-5-phenyl-5H-imidazo[2,1-a]isoindol-5-ol ($R_1$=methyl; $R_2$, $R_3$=H; $R_4$=phenyl).
2. 5-(p-fluorophenyl)-2,3-dihydro-2(or 3)-methyl-5H-imidazo[2,1-a]isoindol-5-ol. ($R_1$ = methyl; $R_2$, $R_3$ = H; $R_4$ = p-fluorophenyl)
3. 5-(p-chlorophenyl)-2,3-dihydro-2(or 3)-methyl-5H-imidazo[2,1-a]isoindol-5-ol. ($R_1$ = methyl; $R_2$, $R_3$ = H; $R_4$ = p-chlorophenyl)
4. 2-[4(or 5)-methyl-2-imidazolin-2-yl]-3'-trifluoromethylbenzophenone, hydrochloride ($R_1$ = methyl; $R_2$, $R_3$ = H; $R_4$ = 3-trifluorophenyl)
5. 3'-chloro-2-(4[or 5]-methyl-2-imidazolin-2-yl)benzophenone, hydrochloride. ($R_1$=methyl; $R_2$, $R_3$=H; $R_4$=3-chlorophenyl)
6. 2'-chloro-2-(4[or 5]-methyl-2-imidazolin-2-yl)benzophenone, hydrochloride. ($R_1$=methyl; $R_2$, $R_3$=H; $R_4$=2-chlorophenyl)

TEST RESULTS

| Compound | Dose mg/kg | Per Cent Change in Blood Sugar, hours | | | | |
|---|---|---|---|---|---|---|
| | | 1 | 2 | 3 | 4 | 5 |
| 1 | 15 | +2 | −8 | −6 | −4 | +6 |
|   | 30 | −20 | −25 | −21 | −21 | −33 |
| 2 | 7.5 | −7 | −13 | −19 | −22 | −20 |
|   | 15 | −31 | −48 | −47 | −43 | −38 |
| 3 | 7.5 | +4 | 0 | −7 | −10 | −5 |
|   | 15 | −20 | −32 | −29 | −27 | −31 |
| 4 | 60 | −7 | −20 | −35 | −35 | −42 |
| 5 | 60 | +4 | −7 | −20 | −22 | −21 |
| 6 | 60 | −13 | −25 | −29 | −29 | −23 |

The results indicate that the test requirements were not met with Compound 1 at a 15 mg/kg dose and with Compounds 2 and 3 at a 7.5 mg/kg dose.

The surprising efficacy of the compounds of formulae I and II above in the test described hereinbefore has clearly indicated that they are active anti-hyperglycemic agents.

In the exercising of the method of the invention, the compounds of formulae I and II used therein may be administered alone or in combination with pharmaceutically acceptable carriers, the proportion of which is determined by the solubility and chemical nature of the compound selected, the chosen route of administration, and standard pharmaceutical practice. For example, they may be administered orally in the form of tablets or capsules, which may contain conventional excipients, or in the form of solutions; or they may be injected parenterally, that is intramuscularly, intravenously or subcutaneously. For parenteral administration, they may be used in the form of sterile solutions, containing other solutes, for example, enough saline or glucose to make the solutions isotonic.

The dosage of the present therapeutic agents will vary with the form of administration and the particular compound chosen. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects.

The compounds (1) of the present invention, when tested in accordance with the test procedure given in detail hereinbefore, are effective to relieve hyperglycemia at dosages in the range of about 10 to about 80 mg/kg. of body weight of the animals tested.

I claim:

1. The method of treating hyperglycemia in a warm-blooded animal suffering from hyperglycemia which comprises orally or parenterally administering to said animal an effective amount for treating hyperglycemia of a compound of the following formulae

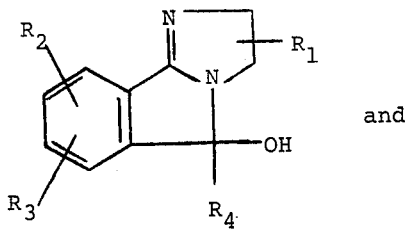 and 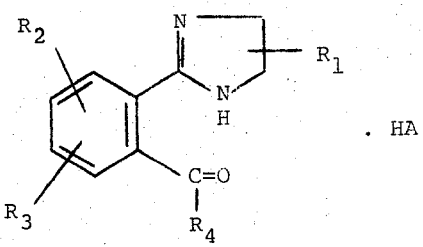

wherein:

$R_1$ is lower alkyl;

$R_2$ is hydrogen; $R_3$ is hydrogen; $R_4$ is selected from the group consisting of phenyl, monohalophenyl, and trifluoro-methylphenyl; and HA is a pharmaceutically acceptable acid.

* * * * *